United States Patent [19]

Campau

[11] Patent Number: 5,542,605
[45] Date of Patent: Aug. 6, 1996

[54] AUTOMATIC LIQUID DISPENSER

[75] Inventor: Daniel N. Campau, Grand Rapids, Mich.

[73] Assignee: Flow-Rite Controls, Ltd., Grand Rapids, Mich.

[21] Appl. No.: 231,742

[22] Filed: Apr. 7, 1994

[51] Int. Cl.⁶ ................................................ A01G 27/00
[52] U.S. Cl. .................... 239/44; 239/43; 239/68; 47/48.5; 47/79; 222/650; 222/416; 222/187
[58] Field of Search .................... 239/44, 49, 50, 239/68, 37, 38, 43; 222/650, 416, 187, 479; 137/132, 453; 47/79 C, 79 V, 48.5 G, 62; 119/77

[56] References Cited

U.S. PATENT DOCUMENTS

| | | | |
|---|---|---|---|
| 1,293,017 | 2/1919 | Broche | 222/479 |
| 2,991,911 | 7/1961 | Spain | 222/416 |
| 3,216,663 | 11/1965 | Frampton et al. | 239/68 |
| 3,430,823 | 3/1969 | Hunsaker | 222/416 |
| 3,941,283 | 3/1976 | Garbe | 222/187 |
| 4,042,150 | 8/1977 | Roos | 222/650 |
| 4,249,559 | 2/1981 | George | 137/124 |
| 4,938,420 | 7/1990 | Ruttenberg | 222/416 |
| 5,238,187 | 8/1993 | Zlotnik et al. | 222/187 |

FOREIGN PATENT DOCUMENTS

| | | | |
|---|---|---|---|
| 2083993 | 4/1982 | United Kingdom | 239/68 |
| 89/05576 | 6/1989 | WIPO | 47/48.5 |

*Primary Examiner*—Karen B. Merritt
*Attorney, Agent, or Firm*—Niro, Scavone, Haller & Niro

[57] ABSTRACT

An automatic liquid dispensing apparatus including a container for holding a dispensable liquid, a flow regulator which permits liquid to flow out of the container at a controlled rate which is independent of the quantity of liquid within the container, and a timing and dispensing assembly. The timing and dispensing assembly accumulates a quantity of the liquid from the flow regulator, and periodically dispenses a constant volume of the liquid.

23 Claims, 4 Drawing Sheets

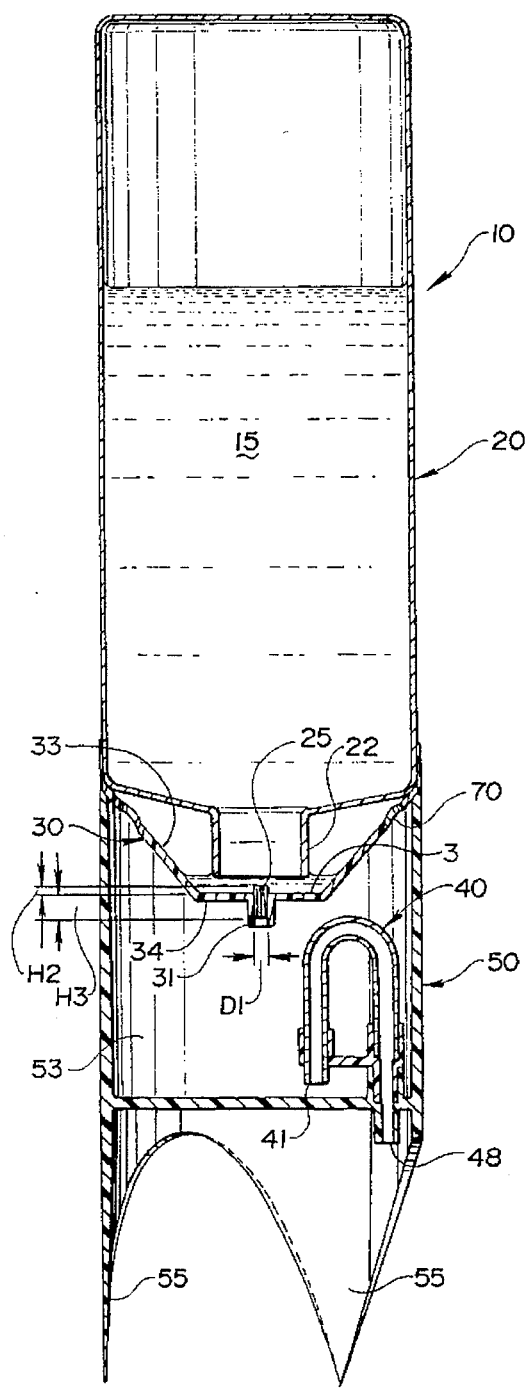
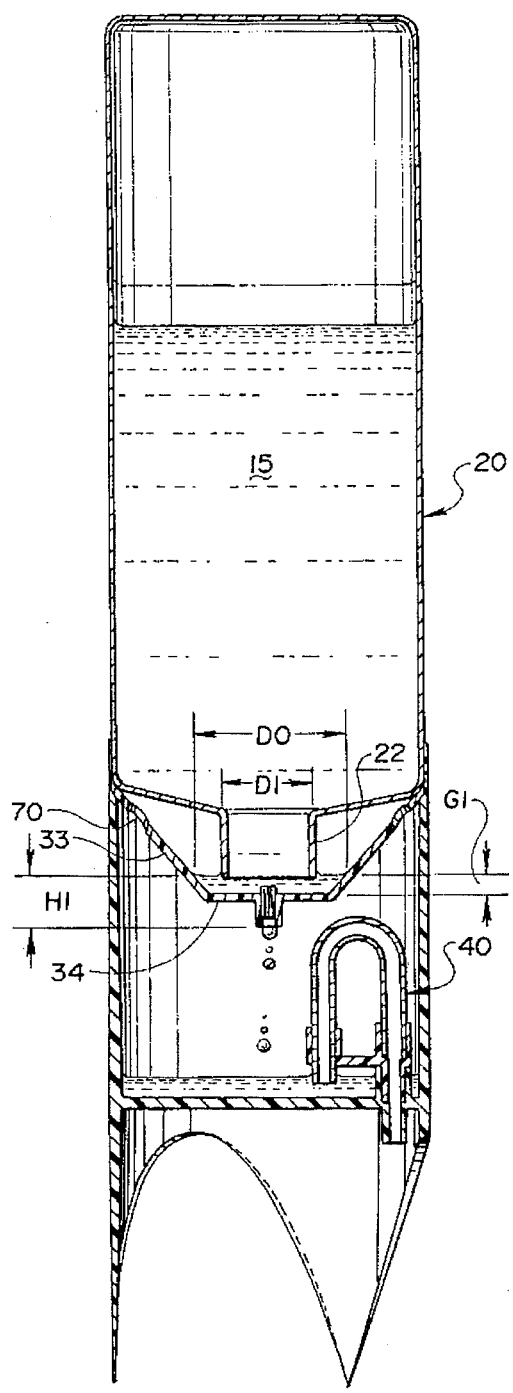

AUTOMATIC LIQUID DISPENSER

Co-pending U.S. Ser. Nos. 07/833,831 (filed Feb. 18, 1992, now U.S. Pat. No. 5,409,135), 07/882,169 (filed May 12, 1992, now abandoned), and 08/056,431 (filed Apr. 30, 1993), now U.S. Pat. No. 5,353,957 are hereby incorporated by reference into this application.

BACKGROUND OF THE INVENTION

The present invention relates generally to a liquid dispenser, and more particularly to an automatic liquid dispenser useful in a variety of applications in which a constant volume of liquid needs to be dispensed at periodic time intervals.

Dispensing liquids on a periodic basis is a common task around the home, workplace, or laboratory. Typical applications that require liquid to be dispensed in a controlled fashion include plant watering/feeding, fertilizing, air freshening, drain cleaning, toilet bowl cleaning, pet watering, medicating, lubricating, humidifying and fumigating.

Expanding on the plant watering/feeding example, house plants are a popular way to create a pleasant, healthy environment in the home or office. However, if there are many plants, this entails a great deal of time, effort and inconvenience. Too little or too much water can injure or kill a plant. Also, many plants do best when the roots are allowed to dry between waterings. Watering should therefore be done on a regular basis using a correct amount of water at the appropriate interval. Also, if the plant caretaker is absent for any extended period of time, arrangements must be made for watering. It is expensive to pay an interim caretaker, and could possibly cause a security problem as well. Therefore, an automatic watering/feeding system would be desirable.

Although various automatic watering systems are known, none are widely used in the home or office. It is known to use automatic systems with mechanical, electronic or electromechanical timers which actuate a valve at a preset interval for a preset time period. It is also common to use systems with small orifices or restrictors which drip water continuously onto the plant. Such systems are typically used in a nursery or garden, where plants are grouped closely together, and water can be supplied from a pressurized source. Since it is necessary to interconnect each plant with a tube or pipe, these systems are impractical or undesirable for the typical home or office where plants are spread out or moved randomly. Further, these types of systems are relatively expensive. Gravity feed from an elevated reservoir is sometimes used but this also includes interconnected tubing and is therefore impractical for most watering requirements in the home or office.

Other methods used to water individual plants, sometimes used by vacationers, may include moving the plants to a sink, for example, and setting them in a shallow level of water, thus soaking the roots continuously for the entire period of absence. This method is impractical where the plants are too numerous or too big to move. It also is harmful to those plants which require roots to dry out between waterings. Too much water can lead to mold, for example, which can kill the plant. Yet another method used includes setting a container of water next to or above the plant and extending a wetted wick from the container to the plant. Capillary action draws water gradually and continually from the container to the plant. This method has several drawbacks. While the flow is continual, the rate of flow varies with the level of water in the container. As the level drops, the flow rate slows. Also, since the flow is continual, there is the possibility of damage to the plant due to over-soaking of the roots.

Air fresheners provide another example of the type of problem which the present invention addresses. Liquid air fresheners are generally designed to maintain a constant concentration of scent molecules in the air. However, it is generally known that the human sense of smell functions in such a way that the perception of a particular scent fades even though the concentration of molecules creating the scent remains essentially the same. The individual tends to blame the air freshener dispenser, which may be functioning as intended. In order to again detect the scent, the individual must be away from the scent for a sufficient period of time, or the molecular concentration must be increased. The disclosed invention offers unique ways to dispense liquid air fresheners that will increase the concentration of scent molecules in the air over time so that the individual perceives the scent over a longer period of time than is presently achieved with uniform rate dispensers.

SUMMARY OF THE INVENTION

A primary object of the present invention is to provide an automatic liquid dispenser apparatus which dispenses a constant volume of liquid at certain discrete time intervals from a liquid storage container. The timing between periodic time intervals is controllable independent of the container level. This goal is accomplished by the use of two separate flow control stages actuated by two separate structural components: (1) a flow-regulator which controls the rate of flow out of the container at a rate which can be independent of the container level; and (2) a timing and dispensing assembly which accumulates the flow from the flow-regulator until a certain constant volume is reached, at which time dispensing occurs.

Accordingly, one object of the present invention is to provide an improved liquid dispenser in which a preset, constant volume of liquid can be dispensed at preset time intervals.

Another object of the present invention is to provide an automatic liquid dispenser which has no moving parts or control valves, facilitating stable performance throughout the period of use.

Yet another object of the present invention is to provide a compact, economic design which is versatile in use, and which can be manufactured in a range of sizes and capacities.

Still another object of the present invention is to provide an economical design which includes dimensionally precise components made from injection molded plastic.

Another object of the present invention is to provide an improved automatic liquid dispenser which can accurately dispense a constant volume of liquid at a rate which is relatively independent of ambient temperature variations.

A still further object of the present invention is to provide an improved liquid dispenser which can be used with liquids having a low viscosity and undergoing a low rate of flow.

In accordance with the present invention, an improved automatic dispenser is provided that preserves the beneficial features and advantages of known devices while at the same time overcoming disadvantages and achieving additional advantages, such as enhanced capabilities, a wider range of use, and a simple economic construction.

In the preferred embodiment of the present invention, an improved automatic liquid dispenser is provided for dispensing a controlled volume of liquid. The liquid dispenser includes a container adapted to hold a dispensable liquid, a flow regulator in fluid communication with the container, and a timing and dispensing assembly in fluid communication with the flow regulator. The flow regulator permits liquid to flow out of the container at a controlled rate which is independent of the quantity of liquid within the container. The timing and dispensing assembly accumulates a quantity of liquid from the flow regulator, and periodically dispenses the liquid when a predetermined, constant volume of the liquid has accumulated.

The liquid dispensing apparatus of the present invention permits an increase or decrease in the rate of flow of the liquid out of the container as the container liquid level drops. Alternatively, the flow regulator can allow a relatively constant rate of liquid to flow out of the container as the container liquid level drops, independent of air temperature variations inside or outside the container. Additionally, liquid within the flow regulator can be re-introduced back into the container, whereby the flow of liquid out of the flow regulator is maintained at a relatively constant rate.

The flow regulator includes a receptacle (such as the cup-shaped receptacle shown in the drawings) for containing the liquid flowing out of the container. The flow regulator also includes at least two ports. One of the ports allows the introduction of vent air into the container below the container liquid level. Another of the ports is positioned below the container liquid level and establishes a liquid flow path by which liquid is permitted to flow out of the container.

A method for automatically dispensing a controlled volume of liquid also forms a part of the present invention. The method of the present invention includes the steps of: providing a container adapted to hold a dispensable liquid; positioning a flow regulator below and in fluid communication with the container, the flow regulator permitting liquid to flow out of the container and into the flow regulator at a controlled rate which is independent of the container liquid level; positioning a static timing and dispensing assembly below and in fluid communication with the flow regulator; accumulating the flow of the liquid from the flow regulator in the timing and dispensing assembly; and periodically dispensing the liquid from the assembly when a predetermined constant volume of the liquid has accumulated.

The method of the present invention permits the controlled rate of liquid flowing out of the container and into the flow regulator to remain relatively constant as the container liquid level drops, independent of temperature variations within the container. Alternatively, in another embodiment, the controlled rate of liquid flowing out of the container and into the flow regulator can be controlled so as to increase as the container liquid level drops.

BRIEF DESCRIPTION OF THE DRAWINGS

These and other features, objects, and advantages of the present invention will become apparent from the following description of the drawings wherein like reference numerals represent like elements in the several views, and in which:

FIG. 3 is a side cross-sectional view of the components of the present invention shown in FIG. 2, as assembled;

FIG. 4 is a side cross-sectional view similar to FIG. 3 in which liquid has been dispensed from the container, through flow regulator 30, and into timing and dispensing assembly 53;

DETAILED DESCRIPTION OF THE PREFERRED EMBODIMENT

Figure 1:
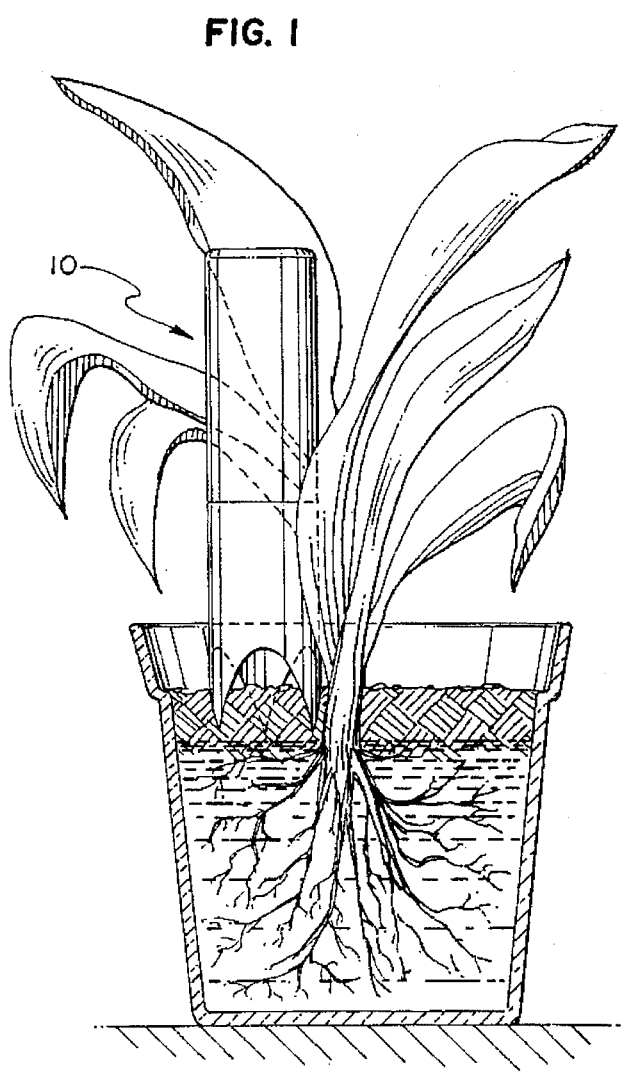
FIG. 1 is a side perspective view of the liquid dispenser of the present invention shown mounted within the soil of a potted plant.
Figure 2:
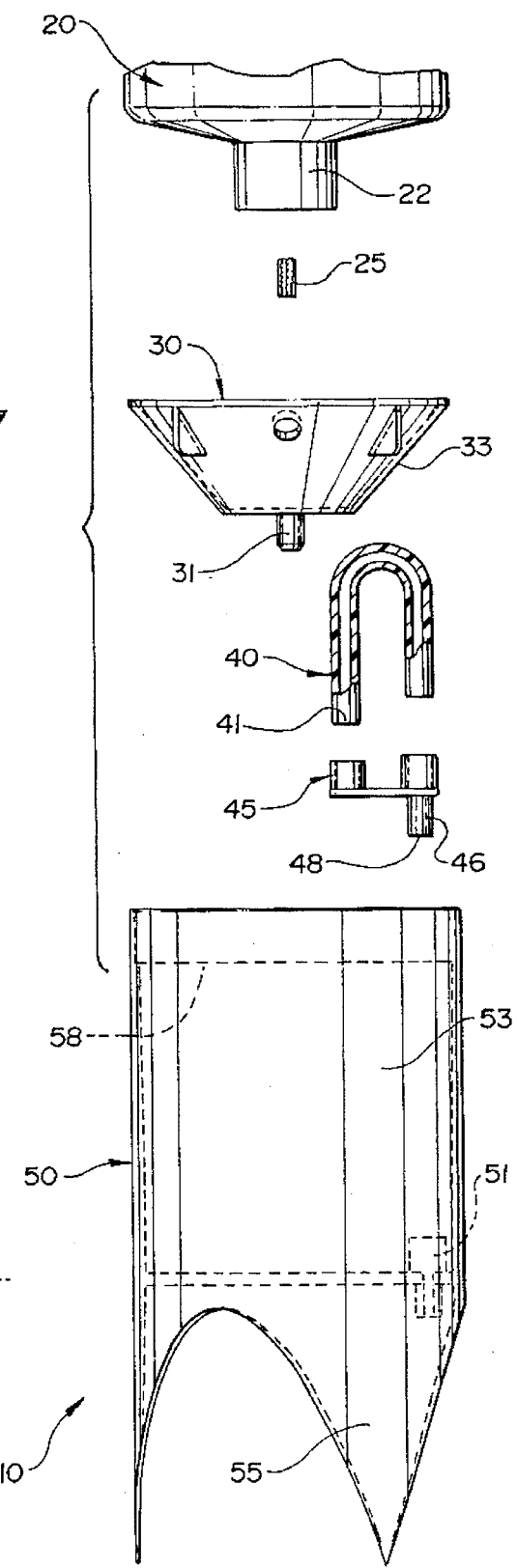
FIG. 2 is an exploded partial cross-sectional view of the liquid dispenser of the present invention, showing the various components prior to assembly.

One preferred embodiment of the automatic liquid dispenser apparatus of the present invention, a plant waterer, is shown generally as 10 in FIG. 1. Referring to FIGS. 2 and 3, liquid dispenser 10 includes a liquid storage container, generally designated 20, which houses liquid 15. Container 20 includes nozzle sidewalls 22 and is positioned above and in press-fit relationship with a mounting base, generally designated 50, having an annular rim 58 (FIG. 7) for seating the sidewall portions of container 20 which press-fit with mounting base 50. Mounting base 50 includes a static timing and dispensing assembly 53 and mounting prongs 55. A cup-shaped static flow regulator, generally designated 30, and having tapering sidewalls 33, a planar bottom surface 34, and a flow regulator discharge port 31 is press-fit into the upper portion of mounting base 50, as shown in FIG. 3. ("Static" is used here to mean that the flow regulator 30 and timing and dispensing assembly 53 are non-moving assemblies which include no moving parts, such as gears, pistons, pumps, etc.)

Tube retainer housing, generally designated 45, is fixably connected to a lower portion of timing assembly 53, and includes an annular boss 46 which assembles in a press-fit relationship into a corresponding recess 51 on mounting base 50. An inverted U-shaped tube 40 interconnects in a press-fit relationship with tube retainer housing 45, as seen in FIG. 3. Finally, hydrophilic restrictor 25 is inserted in a press-fit relationship within a portion of flow regulator port 31, as shown in FIG. 3, and as more specifically described below.

In order to use plant waterer 10, dispenser apparatus 10 is inverted, and mounting prongs 55 are implanted within the soil of the potted plant, as shown in FIG. 1.

The operation of the present invention can best be seen in FIGS. 3–5, and will now be described in general terms. A two-step operation occurs in which a constant volume of liquid ("V") is dispensed, at periodic intervals ("ΔT"), from liquid dispenser 10. In the first stage, flow regulator 30 is in communication with container 20 and controls the rate of flow ("q") out of the container. Depending on the particular application and the type of flow regulator 30 used, the period can increase, remain constant, or decrease as the liquid level in container 20 drops, as is explained below. Liquid from flow regulator 30 is conducted into a second flow control stage, within timing and dispensing assembly 53. Timing assembly 53 accumulates this liquid until volume V is reached, at which time this volume of liquid V is caused to flow out of timing assembly 53, producing the desired intermittent dispensing of a constant volume.

Figure 5:
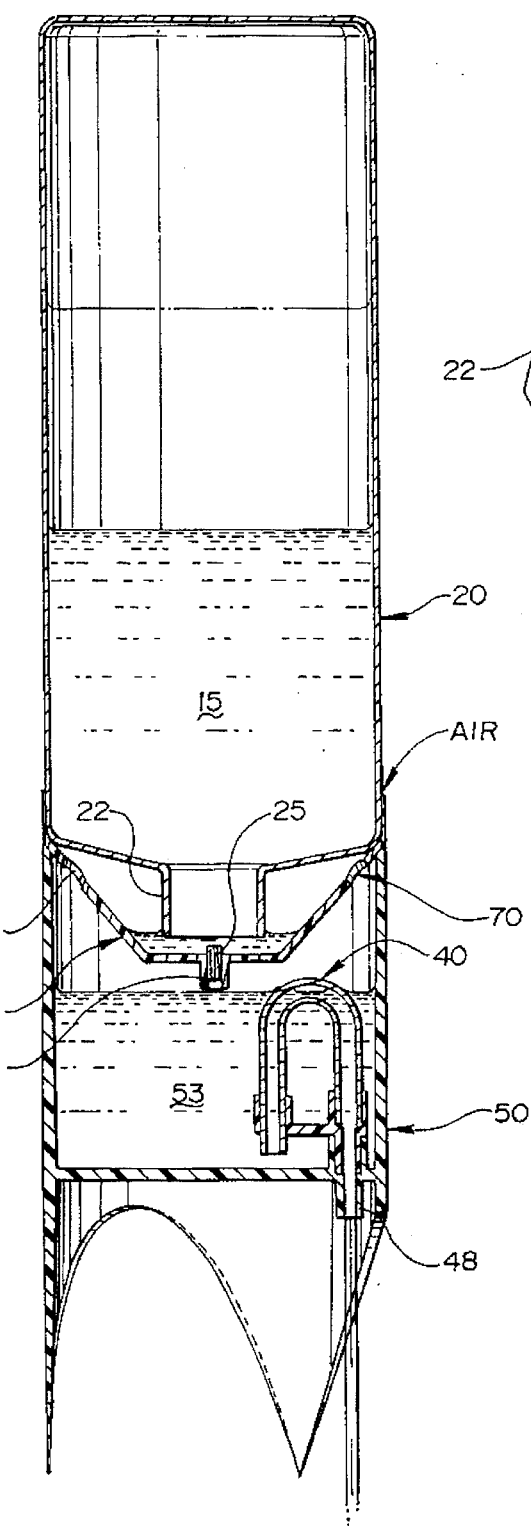
FIG. 5 is a side cross-sectional view similar to FIG. 3 in which water is being dispensed from timing and dispensing assembly 53.

Referring to FIGS. 3–5, the operation of the present invention will now be described in more specific terms. Initially, liquid falls by gravity from storage container 20 into cup-shaped flow regulator 30. This (first stage) flow continues until the liquid level in flow regulator 30 obstructs the entry of air between container nozzle side walls 22 and flow regulator side walls 33 (as shown in FIG. 4). When this occurs, outside air can no longer enter container 20, preventing further flow out of container 20 and into flow regulator 30. Hydrophilic fibrous restrictor 25, located within flow regulator port 31, acts as a flow restrictor while permitting a continuous flow from container 20 through flow regulator 30 and into timing and dispensing assembly 53.

Accurate timing and controlled dispensing are achieved by using the timing and dispensing assembly 53 of the present invention, which contains inverted U-shaped tube 40. Liquid from flow regulator 30 flows into timing and dispensing assembly 53, and flow out of timing assembly 53 is prevented until the liquid level within assembly 53 rises above inverted U-shaped tube 40. Inlet port 41 of U-shaped tube 40 is open and is located near the bottom of timing and dispensing assembly 53, while the other end of U-shaped tube 40 passes through the wall of timing assembly 53 and terminates in an open outlet or discharge port 48 located below the bottom of timing and dispensing assembly 53. As the liquid level rises in timing assembly 53, it also rises in U-shaped tube 40, entering through open end 41. Once the liquid level rises to the top of U-shaped tube 40, it spills over and flows out the other side of U-shaped tube 40. Since outlet port 48 is below the lowest liquid level in assembly 53, U-shaped tube 40 acts as a siphon and assembly 53 is drained to the level of inlet opening 41. In this fashion, the dispensed volume, established by the height of the U-shaped tube, is dispensed intermittently. Further, the dispensing cycle period is uniform since the flow into assembly 53 from flow regulator 30 is the same from one period to the next, as described more specifically below.

It will also be understood that the present invention allows liquid within the flow regulator to be re-introduced back into the container. This will occur when the air volume in the container contracts due to a temperature decrease in the air. In this event, flow into and out of the flow regulator can occur with a minimal change in hydraulic head acting on flow regulator discharge port 31. This permits the flow of liquid out of the flow regulator to be maintained at a relatively constant rate.

Figure 10:
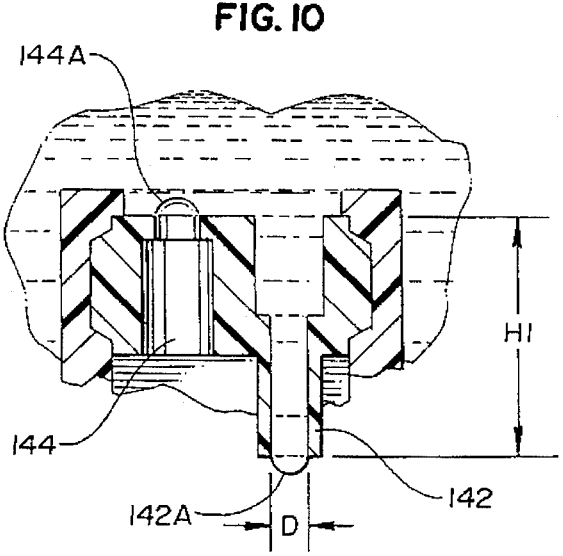
FIG. 10 is a diagrammatic view of the flow regulating means described in my co-pending U.S. Ser. No. 07/833,831, now U.S. Pat. No. 5,409,135.

My co-pending applications, referenced above, illustrate a method of regulating the flow of liquid from a container independent of the liquid volume in the container. In general, this method uses two openings positioned at the bottom of the liquid container, and spaced apart vertically by a small distance, as shown in FIG. 10. This height differential gives rise to a steady flow rate out of the container, independent of the liquid head in the container (see FIG. 9). As explained in those co-pending applications, the flow rate is controlled by the differential height between the openings, the geometry of the openings, and the physical properties of the liquid. I have found that this flow rate can be described accurately by the formula $$q = K^*(H1 - C_n - C_v)$$

where $K$ = coefficient dependent on the path through the nozzle ($K = \Pi \rho g D^4 / 128 L\mu$, for laminar flow in tubes)
$\rho$ = fluid density, slugs/in$^3$
$g$ = gravitational constant, 386.4 in./sec$^2$
$D$ = nozzle tube bore diameter (inches)
$L$ = nozzle tube length (inches)
$\mu$ = dynamic viscosity of liquid, lb.sec./in.$^2$
$H1$ = differential in height between two openings
$C_v$ = constant due to surface tension resistance to flow at the air vent port, expressed as a loss of head (inches)
$C_n$ = constant due to surface tension resistance to flow at the nozzle outlet port, expressed as a loss of head (inches)

Since all of the variables are known except $C_v$ and $C_n$, the combined effect of surface tension acting at both the nozzle outlet and air vent port (as shown at FIG. 10) can be determined experimentally by measuring the flow rate for a given differential height, H1, and calculating a constant $C = C_v + C_n$. The equation for flow can then be simply written $q = K(H1 - C)$. The desired flow rate can easily be achieved by adjusting H1, D or L as required. As long as the vent port diameter and the nozzle drop formation diameter do not change, the surface tension effect will be accurately accounted for by the experimental value for C. (Note that L and H1 are not necessarily the same since the nozzle tube can be coiled or spiraled to increase its liquid flow path without changing its overall height.)

Figure 9:
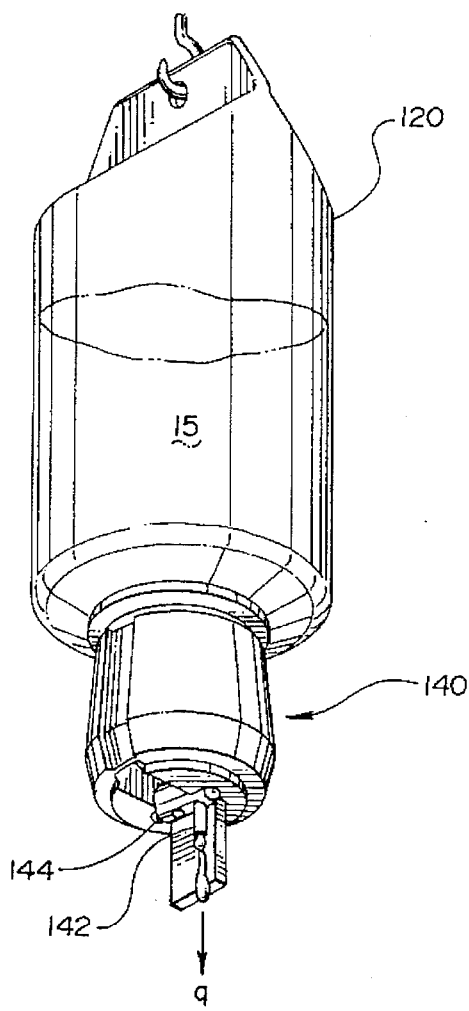
FIG. 9 is a perspective view of the liquid dispensing apparatus disclosed in my co-pending U.S. Ser. No. 07/833,831 now U.S. Pat. No. 5,409,135.

When very low flow rates of low viscosity liquids are needed ("microflow" rates will be termed here as rates of about 0.3 millimeters per hour, or six drops per hour, or less), however, two problems arise with the flow regulator described in my co-pending applications and shown in FIGS. 9 and 10, which are solved by the present invention. The first problem is that the coefficient K can increase dramatically ("the K increase problem"), requiring a long, small diameter tube to produce the necessary flow restriction. This results in a loss of self priming capability, causing flow to stop due to surface tension resistance of trapped air in the tube. The second problem occurs when the ambient temperature varies ("the temperature cycling problem"), which can result in inaccurate flow rate regulation. The causes of each of these problems, as well as an explanation of how the present invention solves these problems, now follows.

Regarding the K increase problem, a comparison of the K values for the relatively high viscosity glycerin/water solution (discussed in my co-pending applications) with water shows the following:

Glycerin/water solution:

$$\mu/\rho = 174.9(10^{-3}) \text{in.}^2/\text{sec.} \rightarrow K_G = 54.223 \, D^4/L$$

Water:

$$\mu/\rho = 1.515(10^{-3}) \text{in.}^2/\text{sec.} \rightarrow K_W = 6.260(10^3) D^4/L$$

To achieve the same flow rate with water as with glycerin/water, under the same H1, requires equal coefficients ($K_W =$ $K_G$), ignoring small surface tension differences. This requires the $D^4/L$ ratio for water to be smaller than the $D^4/L$ for glycerin/water by a factor of $54.223/6.260(10^3)= 8.622(10^{-3})$. To take a specific example, if, for glycerin/water, values of D=0.045 inches and L=0.5 inches are used to produce a flow rate q, then a pair of D and L values that would produce the same flow of water are D=0.031 inches and L=13 inches. Assuming a tube of length L=13 inches could be coiled so that the vertical height between the ends would be just H1=0.5 inches (i.e., the same H1 as for the glycerin/water application), this length may be practical in some applications, but for many applications, it presents the difficulty that in order to operate, the tube of length L must be primed, or filled with liquid. If not solidly filled with liquid, the flow could be effectively blocked by trapped air which increases surface tension resistance.

Therefore, for low flow, low viscosity applications, a self-priming means is needed to assure proper operation. If a smaller diameter D is chosen, a shorter length L could be used, but the possibility of plugging increases, particularly with tap water. Even with a small diameter D, the surface tension resistance from any trapped air would still prevent self-priming. An effective solution to this problem has been found: the use of a hydrophilic fibrous material as a self-priming restrictor.

As shown in FIGS. 3–5, hydrophilic restrictor 25 projects into the liquid at its upper end so that it is effectively wetted by the liquid. Hydrophilic restrictor 25 is preferably pressed into the controlled diameter of flow regulator port 31 to set the desired flow restriction. Capillary action causes the liquid to be drawn down the restrictor so that head H1 develops, assuring continued flow and eliminating air locks. This also has the advantage that the fibrous material can be selected and controlled to have high flow resistance in a short length. This allows a compact overall size, even for low viscosity liquids. The flow resistance of the restrictor can be controlled by selecting the bore diameter of flow regulator port 31 (D1, as shown at FIG. 3) to be smaller than the diameter of restrictor 25, so that the fibers are squeezed a controlled amount upon assembly. It has been found especially practical to control the flow rate, q, by changing only this interference fit relationship. Changing only bore diameter D1 also makes it easier to tool and manufacture a family of dispensers with different flow capacities.

The flow characteristic for flow regulator 30 with hydrophilic restrictor 25 has been found to be of the form q=K*(H1–C). The coefficient K can be determined experimentally by measuring the flow at at least two points and calculating the values of K and C. The surface tension constant C would be the same as previously determined if the air vent port diameter, drop formation diameter and liquid were the same. With felt and cotton ¼ inch diameter cord fiber restrictors, it has been found that self-priming is assured when H2 is about ⅛ inches, and H3 is 0.375 inches (H₂ and H₃ are shown at FIG. 3). Flow rates of ½ ml./hr. to 2 ml./hr. of water can be achieved with D1=0.140 to 0.160 inches, when H1=0.5 inches (see FIG. 4).

Hydrophilic restrictor 25 may be made of any material that is not adversely affected by exposure to the liquid, as long as it is hydrophilic in aqueous solutions to allow capillary action to establish the head necessary for steady flow. Natural fibers such as wool, felt and cotton function well, though it is desirable to pre-shrink natural fibers for stable performance. Porous plastic, polyester, porous ceramic or porous metallic materials may also be used, either alone (if treated to be made hydrophilic), or in combination with a natural fiber. Porous plastic may be preferred since it can be molded to the proper shape and porosity, although it is more costly than natural fiber woven or pressed cord materials.

The temperature cycling problem must also be addressed. Heat transfer into or out of container 20 expands or contracts the air inside the container. Due to the typical operation of thermostats, there is a repeated temperature swing in most rooms that can add to or reduce the effective head acting on the outlet, causing a variation in flow rate. When air temperature increases, for example, the air pressure increases and the flow rate increases until equilibrium is once again established, and flow returns to the design rate. Conversely, when temperature decreases, the air in the container contracts, lowering the pressure inside the container and reducing the flow rate, until equilibrium is established and flow again returns to the design rate. The degree of variation in flow rate depends on the volume of air inside the container. If the container is nearly full of liquid, the effect is small. Thus, as the container empties, the overall average flow rate is greater near the end of the service life of the container of liquid. This may often be an undesirable effect, but it does provide a way of introducing (for example) a higher concentration of scent molecules over time for liquid air freshener applications.

The magnitude of the temperature cycling problem can be estimated from the ideal gas law: PV/T=Constant. Therefore, for a change in temperature ΔT of air inside a container there will be a change in air pressure ΔP=ΔT*P/T inside the container. The volume of air can expand to reduce this pressure increase only by pushing liquid out of the container. The volume of liquid pushed out (to restore equilibrium) can be approximated by assuming this occurs at a constant temperature, so that ΔV=ΔP*V/P, where V is the volume of air in the container. ΔV must be expelled by an increase in flow rate before equilibrium can be re-established. The increase in pressure, ΔP, is a function of the temperature change, independent of the volume V. But the volume change, ΔV, is a direct function of the volume of air in the container. As V increases, the volume change due to temperature change increases, and the variation in flow also increases.

For large containers, this effect could be unacceptable, even in air freshener applications. This is shown, by way of example, through the effect of a 5° F. temperature increase on a 32 ounce container, at different air/liquid ratios. Initially, the filled container may have 1 oz. of air and 31 oz. of liquid. For nominal conditions of P=14.7 psi. and T=530° R, ΔP=5*(14.7/530)=0.139 psi. and ΔV=(0.139)(1/14.7)= 0.009 oz. At the other extreme, the volume of air may be 31 oz. with just 1 oz. of liquid remaining. In this case, the 5° F. temperature increase still produces a pressure increase, ΔP=0.139 psi, but now the volume change needed to restore equilibrium is ΔV=(0.139)(31/14.7)=0.292 oz. Since this effect can occur repeatedly during the product life, the cumulative effect on the accuracy of dispensed volume can be very significant. Therefore, a method is needed to control dispensing accuracy due to temperature variation.

Flow Regulator

Figure 6:
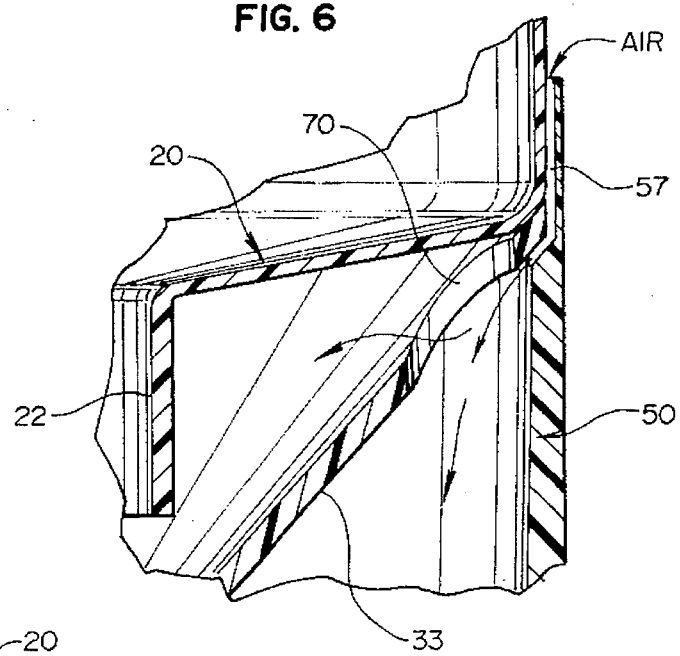
FIG. 6 is a exploded cross-sectional view of a portion of flow regulator 30, in which the flow of outside air is shown entering the flow regulator.
Figure 7:
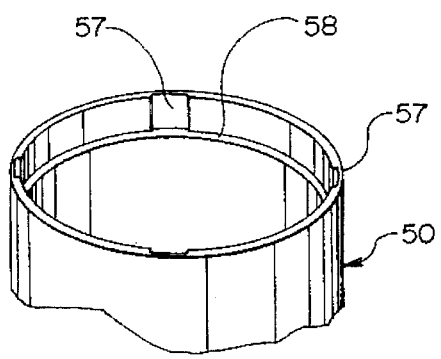
FIG. 7 is a partial side and planar prospective view of the top portion of mounting base 50.
Figure 8:
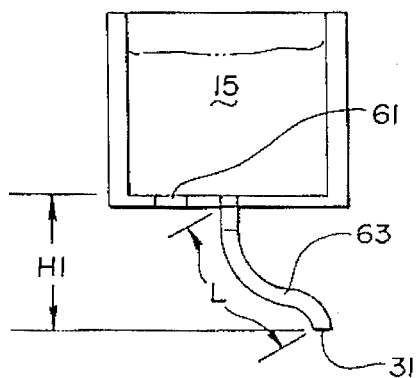
FIG. 8 is a diagrammatic view of a selected portion of a flow regulator according to the present invention illustrating a curved liquid discharge tube.

A solution to the problem introduced by temperature variation is to eliminate or reduce the change in pressure due to a temperature change. If the volume can expand or contract without changing the pressure significantly, then the flow regulation would remain accurate. Flow regulator 30 solves this problem. As seen in FIGS. 3–5, the air vent port of my co-pending applications is replaced by cup-shaped flow regulator 30, which includes tapering sidewalls 33, flat bottom surface 34, flow regulator port 31, and air vent ports 70. Bottom surface 34 of flow regulator 30 is spaced from the ends of container nozzle sidewalls 22 a distance G1 (as shown at FIG. 4). Liquid flows from the container into the "cup" (i.e., flow regulator 30) until a liquid level is established in the cup at the container opening, giving a head, H1, as shown in FIG. 4. This prevents further flow out of container 20 since vent air can no longer enter the container through the openings in flow regulator 30. (As illustrated in FIGS. 6 and 7, depressions 57 within mounting base 50 permit outside air entry.) Now, if a temperature increase occurs, the air in container 20 can readily expand, increasing the liquid level in the cup slightly, and raising slightly the head, H1.

Thus, it will now be understood that the volume change, $\Delta V$, due to temperature change, $\Delta T$, can be absorbed by increasing the volume of liquid in the cup, rather than dispensing the liquid through flow regulator port 31. Additionally, the increase in head in the cup to absorb this volume is very small as compared, for example, to the embodiment described in my co-pending applications. For example, in that embodiment a temperature increase of 5° F. caused a 0.139 psi increase in pressure, which acted directly to produce increased flow through the outlet port. This pressure of 0.139 psi is equal to 3.86 in. of water head. With the present invention, a temperature increase of 5° F. will still cause a change in volume, $\Delta V$, of 0.292 oz. However, this volume will enter the cup, raising the level in the cup an amount equal to $\Delta H1 = \Delta V/A$, where A is the cup area ($A = \Pi(D0^2 - D1^2)/4$). For the 32 oz. size container, $D0 = 1.40$ inches and $D1 = 0.813$ inches. Therefore, $A = 1.020$ in.$^2$ and $\Delta H1 = 0.527/1.020 = 0.517$ in., which is only 13.4% as large as the pressure increase was in the earlier example. Equally important is the fact that as temperature varies both up and down, the liquid in the cup can rise and fall to maintain pressure equilibrium with minimal effect on flow rate.

Cyclic changes in temperature are likely for plant waterers, liquid air fresheners, and many other applications. Therefore, to maintain accurate periods between dispensing, this method of flow regulation is needed. Small volume air freshener dispensers may not need this feature, although the larger sizes intended for long service life would likely benefit also. The desirable effect of increasing scent molecule concentration to enhance perception can be achieved by setting the dispensing volume and interval.

In some cases it may be desirable to have the flow rate decrease over time. In this case, flow regulator 30 would be a suitable restrictor communicating with the liquid in container 20 and located at the bottom of the container, while the vent air would be introduced at the top of the container, above liquid level. The full head of liquid would act on the restrictor so that the flow rate would be greater at the start, when the container is full, and decrease steadily as the liquid level in the container drops. In other words, the effect would be to simply drain the container through a restricted opening. Again, this use of flow regulator 30, in combination with timing and dispensing assembly 53, produces a novel method of dispensing an intermittent constant volume at increasing time intervals.

Timing and Dispensing Assembly

In order to complete the task of periodic dispensing of a specific liquid volume, a reliable method is needed to automatically initiate dispensing in response to the passage of a preset period of time, and to dispense the desired amount of liquid. When the flow rate from flow regulator 30 is steady over time, accurate timing and control of dispensing can be achieved using the siphon tube arrangement shown in FIGS. 3–5. Liquid from flow regulator 30 flows freely into timing and dispensing assembly 53, positioned directly below flow regulator port 31. Flow out of timing assembly 53 is prevented until the liquid level rises above inverted U-tube 40, which acts as a siphon. Inlet port 41 of U-tube 40 is open near the bottom of timing assembly 53, while the other end of U-tube 40 passes through the wall of the assembly and terminates in an outlet port 48. Outlet port 48 is sealed against any flow or leakage around its point of passage through assembly 53. As the liquid level rises in assembly 53, it also rises in U-tube 40, entering through inlet port 41. Once the liquid level rises to the top of U-tube 40, it flows out the other side and through outlet port 48. In this fashion all of the liquid in assembly 53 is siphoned through tube 40 and dispensed. The dispensing cycle period is uniform since the flow into assembly 53 from flow regulator 30 is the same from one period to the next.

It has been found that U-shaped tube 40 must be positioned and sized appropriately for proper operation. If inlet port 41 is too close to the bottom of timing assembly 53, an alternating pattern of air bubbles and liquid is drawn into U-shaped tube 40 as the liquid drains from timing assembly 53. This can break the siphon action and leave U-shaped tube 40 filled or partially filled with air bubbles and liquid. This creates significant resistance to flow so that on the next cycle, U-shaped tube 40 may not refill, but can lock up and fail to siphon off liquid volume at the appropriate time. To avoid this problem, inlet port 41 should be located above the bottom surface of timing assembly 53 by a sufficient distance (related to the surface tension of the liquid) so that air bubbles do not form in the tube. This is most easily determined by means of empirical testing. At the correct distance, timing assembly 53 will empty fully with no formation of air bubbles. In addition, inlet port 41 must be effectively parallel to the bottom surface of timing assembly 53. This will allow the surface tension of the liquid to form a skirt at inlet port 41. This surface tension skirt allows the liquid to quickly separate from the end of the tube, so no air bubbles form. Thus, this skirt allows the siphon action to empty the timing assembly, permitting tube 40 to clear so that it refills properly on the next cycle. As one example, when the liquid is water and the application is plant watering, for a typical plant waterer configuration and typical size, the inlet port 41 should be about 3/16 inch above the bottom surface of timing assembly 53.

Another problem has been found to occur with U-shaped tube 40. If the flow of liquid through tube 40 is too rapid, air bubbles can form along the trailing edge of the liquid slug as it flows out of the tube. Once again, these air bubbles add resistance so that tube 40 can fail to refill properly on the next cycle. The solution to this problem is to restrict outlet port 48 slightly to slow the velocity of liquid flowing through tube 40. This provides an unbroken air/liquid interface at the trailing edge of the liquid slug as it clears tube 40. A small amount of liquid remains hanging on outlet port 48 due to surface tension, but this has been found to be easily pushed out as the liquid level in the timing assembly rises and pushes into inlet port 41 of tube 40. As an example, using water in a typical plant waterer configuration, an inlet tube 40 diameter of 0.125 inch and outlet tube 48 diameter of 0.094 inch have been found to work effectively.

Although the sizes for air freshener dispensers will generally be smaller than for plant waterers, the same general design principles apply. Thus, it will now be understood that in those cases where the flow from flow regulator 30 is not constant, but increases or decreases with the liquid level in the container, timing and dispensing assembly 53 will still deliver a constant volume, but the period between dispensing cycles will decrease or increase, respectively, as the level in the container drops.

An example of an increasing flow rate given a decreasing container liquid level will now be described. Referring now to FIGS. 9 and 10, the liquid dispensing apparatus described in my co-pending U.S. Ser. No. 07/833,831 is shown. This apparatus includes an inverted container 120 and a liquid dispensing nozzle 140. Nozzle 140 includes liquid discharge conduit 142 and air intake passageway 144. The lower-most end of liquid discharge conduit 142 is positioned below the upper-most end of air intake passageway 144. Referring to FIG. 10, liquid discharge conduit 142 terminates in liquid discharge port 142A, and air intake passageway 144 terminates at its upper-most end in air intake port 144A. Each port is in fluid communication with liquid 15 within container 120, and a differential head H1 is established. This head causes forces to be generated at the interface of each of the ports 142A and 144A acting against the surface tension of the liquid exposed at each of these ports, and tending to move the liquid at each port in opposite directions. This phenomenon, shown in FIG. 10, increases the differential head and accelerates the growth of a droplet at liquid discharge port 142A, and the growth of an air bubble at air intake port 144A. This continues until a discrete droplet is dispensed at liquid discharge port 142A, and a discrete air bubble separates from air intake port 144A and rises to the surface of the liquid level inside the container. This reestablishes the original differential head, and the process continues in a reoccurring fashion.

It will be understand from the foregoing that with the dispensing apparatus shown in FIGS. 9 and 10, as the temperature increases under normal environmental thermostat controls, the air pressure above the decreasing liquid level in the container also increases due to thermal expansion of the air, exerting an increased pressure pushing down on the liquid in the closed container. This added air pressure increases the overall differential head, resulting in an increase of the effective head and a corresponding increased dispensing rate.

Therefore, in the air freshener application, if only the flow regulator shown in FIGS. 9 and 10 is used, the concentration of the air freshener will tend to increase over time, helping to offset the physiological characteristic in humans in which sensitivity to a scent diminishes over time.

Figure 11:
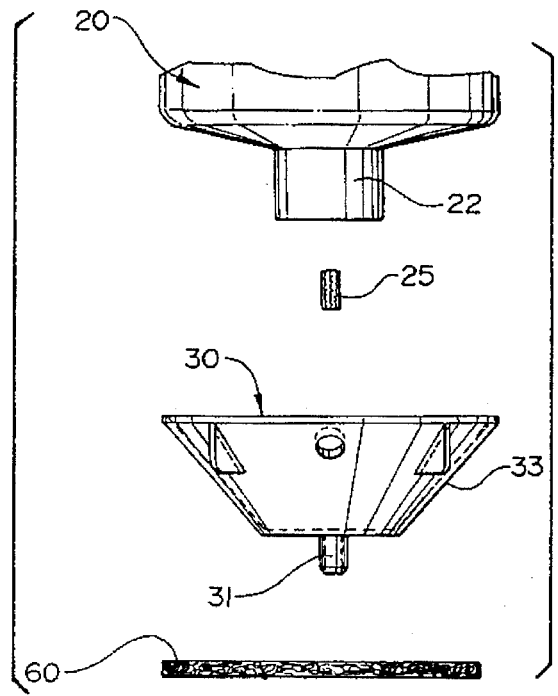
FIG. 11 is an exploded partial cross-sectional view of the flow regulator of the present invention illustrating absorbent pad evaporation augmenter 60.

Liquid air freshener from the flow regulator can be permitted to flow onto any means capable of augmenting the evaporation of the air freshener into the air, such as an absorbent pad 60 (shown in FIG. 11), a hot plate, an air stream, etc. Alternatively, if a consistent amount of air freshener is required, the liquid air freshener can be permitted to flow from the flow regulator of the cup configuration shown in FIGS. 1–5. Either type of flow regulator can be used with or without the timing and dispensing assembly described above.

With regard to virtually any embodiment which the present invention may take, an effective use of the flow regulators described here or in my co-pending applications can be made in the absence of the timing and dispensing assembly described above. In any one of these alternative embodiments, of course, the hydrophilic restrictors described here may be used to induce liquid flow from a container through capillary action.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A portable automatic liquid dispensing apparatus for the intermittent dispensing of a controlled volume of liquid, comprising:

a container adapted to hold a dispensable liquid, thereby defining a liquid level within the container;

a static flow regulator in fluid communication with the container, the flow regulator being configured to permit a controlled, relatively constant rate of flow of the liquid out of the container which is independent of the liquid level within the container; and a timing and dispensing assembly in fluid communication with the flow regulator, the timing and dispensing assembly having a chamber and a siphon tube with an inlet opening and a liquid dispensing port, and being adapted to receive the liquid from the flow regulator and to periodically dispense the liquid from the chamber when a predetermined constant volume of the liquid has accumulated, the inlet opening being in fluid communication with the chamber and the siphon tube permitting intermittent draining of the liquid within the chamber through the liquid dispensing port when the liquid within the chamber has reached a predetermined level.

2. The portable automatic liquid dispensing apparatus of claim 1, wherein the flow regulator receives liquid dispensed from the container, thereby defining a liquid level within the flow regulator, and the relatively constant rate of flow of the liquid out of the container is maintained by permitting liquid to flow between the flow regulator and the container in correspondence with temperature variations inside the container.

3. The portable automatic liquid dispensing apparatus of claim 1, wherein liquid within the flow regulator can be re-introduced back into the container, whereby the flow of liquid out of the flow regulator is maintained at a relatively constant rate.

4. The portable automatic liquid dispensing apparatus of claim 1, the flow regulator further comprising:

a receptacle for containing the liquid flowing from the container; and at least two ports, including an air inlet port permitting the introduction of air into the receptacle, and a liquid discharge port through which liquid is permitted to flow to the chamber of the timing and dispensing assembly.

5. The portable automatic liquid dispensing apparatus of claim 4, wherein the vertical distance between the air inlet port and the liquid discharge port of the flow regulator establishes a relatively constant hydraulic head which is substantially independent of the container liquid level.

6. The portable automatic liquid dispensing apparatus of claim 5, wherein the hydraulic head remains relatively constant and substantially independent of pressure changes due to temperature variations inside the container.

7. The portable automatic liquid dispensing apparatus of claim 1, the flow regulator including a liquid discharge port and further comprising a hydrophilic restrictor at least partially disposed within the liquid discharge port, the hydrophilic restrictor inducing liquid flow from the container through the flow regulator by capillary action.

8. The portable automatic liquid dispensing apparatus of claim 7, wherein the hydrophilic restrictor includes a fibrous material.

9. The portable automatic liquid dispensing apparatus of claim 7, wherein the hydrophilic restrictor includes a porous material.

10. The automatic liquid dispensing apparatus of claim 1, wherein the siphon tube is an inverted, U-shaped tube, the lowermost portion of the liquid dispensing port of the siphon tube being located below the inlet opening, and the inlet opening being substantially parallel to, and located a sufficient distance from, the bottom surface of the chamber so that a sufficient surface tension is developed at the inlet opening to substantially prevent the formation of air bubbles inside the siphon tube during or after liquid dispensing.

11. The automatic liquid dispensing apparatus of claim 10, wherein the diameter of the liquid dispensing port of the siphon tube is less than the diameter of the inlet opening.

12. An automatic liquid dispensing air freshener, comprising:
   a container adapted to hold a dispensable liquid, thereby defining a liquid level within the container; and
   a flow regulator positioned below the container liquid level and in fluid communication with the container, the flow regulator including an air intake port and a liquid discharge conduit, the liquid discharge conduit terminating at its lower-most end in a liquid discharge port positioned below the air intake port when the container is oriented to dispense the liquid, the air intake and liquid discharge ports being in fluid communication with the liquid in the container;
   the flow regulator permitting a controlled, increasing rate of flow of the liquid out of the container as the container liquid level decreases; and
   a timing and dispensing assembly in fluid communication with the flow regulator and adapted to periodically dispense a predetermined, relatively constant quantity of liquid accumulated from the flow regulator.

13. A method for dispensing a controlled volume of liquid, comprising the steps of:
   providing a container holding a dispensable liquid, and thereby defining a liquid level within the container;
   providing a dispensing apparatus in fluid communication with the container, the dispensing apparatus including a static flow regulator and a static timing and dispensing assembly;
   positioning the static flow regulator below and in fluid communication with the container, the flow regulator permitting liquid to flow out of the container and into the flow regulator at a controlled, relatively constant rate which is independent of the container liquid level;
   positioning the static timing and dispensing assembly in fluid communication with the flow regulator, the timing and dispensing assembly including a chamber for containing liquid received from the flow regulator;
   accumulating the flow of the liquid from the flow regulator in the chamber of the timing and dispensing assembly; and
   periodically dispensing the liquid from the chamber through the use of siphoning action when a predetermined constant volume of the liquid has accumulated.

14. An automatic liquid dispensing apparatus for dispensing a controlled volume of liquid, comprising:
   a container adapted to hold a dispensable liquid, thereby defining a liquid level within the container;
   flow regulator means in fluid communication with the container, the flow regulator means including a receptacle for containing liquid from the container, a liquid discharge port and a hydrophilic restrictor at least partially disposed within the liquid discharge port, the hydrophilic restrictor functioning to limit the effects of surface tension resistance within the liquid discharge port and to induce liquid flow through the liquid discharge port, the flow regulator means thereby permitting a controlled rate of flow of the liquid out of the container which is independent of the container liquid level; and
   timing and dispensing assembly means in fluid communication with the flow regulator means, the timing and dispensing assembly means accumulating a quantity of the liquid from the flow regulator means, and then periodically dispensing the liquid when a predetermined constant volume of the liquid has accumulated.

15. An automatic liquid dispenser, comprising:
   a container adapted to hold a dispensable liquid, thereby defining a liquid level within the container;
   a flow regulator in fluid communication with the container, the flow regulator including:
      a receptacle in fluid communication with the container for holding liquid flowing from the container, the receptacle having a liquid level;
      an air inlet port permitting the passage of air into the receptacle;
      a liquid discharge conduit in fluid communication with the receptacle and terminating in a liquid discharge port, the liquid discharge port spaced vertically from the liquid level within the receptacle;
      a hydrophilic restrictor at least partially disposed within the liquid discharge conduit;
      the vertical distance between the liquid level within the receptacle and the liquid discharge port defining a liquid head which remains relatively constant during dispensing, the liquid head blocking the passage of air into the receptacle; and
   the liquid discharge conduit having a liquid flow path greater than its height and permitting a rate of flow of liquid out of the container which is independent of the container liquid level.

16. The automatic liquid dispenser of claim 15, further comprising a timing and dispensing assembly in fluid communication with the flow regulator, the timing and dispensing assembly being adapted to receive the liquid from the flow regulator and to periodically dispense a predetermined, substantially constant amount of the received liquid.

17. The automatic liquid dispenser of claim 10, further comprising an evaporation augmenter for receiving at least a portion of the controlled rate of flow of liquid from the flow regulator.

18. The automatic liquid dispenser of claim 17, wherein the liquid dispenser is an air freshener and the evaporation augmenter includes an absorbent pad.

19. An automatic liquid dispensing apparatus for dispensing a controlled volume of liquid, comprising:
   a container adapted to hold a dispensable liquid, thereby defining a liquid level within the container;
   a flow regulator in fluid communication with the container, the flow regulator being configured to permit a controlled rate of flow of the liquid out of the container which is independent of the liquid level within the container;
   the flow regulator including a receptacle for containing the liquid flowing from the container, a first opening providing a fluid path between the container and the receptacle, an air inlet port permitting the introduction of air into the container through at least one air flow path, a liquid discharge conduit terminating in a liquid discharge port through which liquid from the receptacle can flow, and a hydrophilic restrictor at least partially disposed within the liquid discharge conduit and inducing a controlled flow of the liquid from the container through the flow regulator by capillary action;

the vertical distance between the first opening and the liquid discharge port causing the formation of a predetermined liquid head which remains relatively constant during dispensing, the liquid head blocking the at least one air flow path; and a timing and dispensing assembly in fluid communication with the flow regulator, the timing and dispensing assembly having a liquid dispensing port and a chamber for containing the liquid received from the flow regulator, the timing and dispensing assembly being adapted to receive the liquid from the flow regulator and to periodically dispense the liquid from the chamber through the liquid dispensing port once a predetermined constant volume of the liquid has accumulated in the chamber.

20. An automatic liquid dispensing apparatus for the microflow dispensing of a controlled volume of liquid, comprising:

a container adapted to hold a dispensable liquid, thereby defining a liquid level within the container, and an air space within the container and above the liquid level;

a flow regulator in fluid communication with the container, the flow regulator including a receptacle for containing the liquid from the container, and an air inlet port permitting the introduction of air into the container;

the flow regulator being static and permitting a controlled, relatively constant rate of flow of the liquid out of the container which is independent of the liquid level within the container; and the receptacle of the flow regulator being in two-way fluid communication with the container, so that liquid can flow in a first direction from the container and into the receptacle, or in a second direction from the receptacle and back into the container, with flow in either the first direction or the second direction occurring without substantially disturbing the dispensing rate, and the flow rate thereby being substantially independent of temperature variations within the air space of the container.

21. The automatic liquid dispensing apparatus of claim 20 for the microflow dispensing of a controlled volume of liquid, further comprising an evaporation augmenter adapted to receive at least a portion of the controlled, relatively constant flow of liquid from the flow regulator.

22. A portable automatic liquid dispensing apparatus for the intermittent dispensing of a controlled volume of liquid, comprising:

a container adapted to hold a dispensable liquid, thereby defining a liquid level within the container;

a static flow regulator in fluid communication with the container, the flow regulator being configured to permit an increase in the rate of flow of the liquid out of the container as the container liquid level falls; and a timing and dispensing assembly in fluid communication with the flow regulator, the timing and dispensing assembly having a chamber and a siphon tube with an inlet opening and a liquid dispensing port, and being adapted to receive the liquid from the flow regulator and to periodically dispense the liquid from the chamber when a predetermined constant volume of the liquid has accumulated, the inlet opening being in fluid communication with the chamber and the siphon tube permitting intermittent draining of the liquid within the chamber through the liquid dispensing port when the liquid within the chamber has reached a predetermined level.

23. A method for dispensing a controlled volume of liquid, comprising the steps of:

providing a container holding a dispensable liquid, and thereby defining a liquid level within the container;

providing a dispensing apparatus in fluid communication with the container, the dispensing apparatus including a static flow regulator and a static timing and dispensing assembly;

positioning the static flow regulator below and in fluid communication with the container, the flow regulator permitting liquid to flow out of the container and into the flow regulator at an increasing rate as the container liquid level decreases;

positioning the static timing and dispensing assembly in fluid communication with the flow regulator, the timing and dispensing assembly including a chamber for containing liquid received from the flow regulator;

accumulating the flow of the liquid from the flow regulator in the chamber of the timing and dispensing assembly; and periodically dispensing the liquid from the chamber through the use of siphoning action when a predetermined constant volume of the liquid has accumulated.

* * * * *